2,945,855
Patented July 19, 1960

2,945,855

10-(1-SUBSTITUTED-3-PYRROLIDYLMETHYL) PHENOTHIAZINES

Rolland Frederick Feldkamp and Yao Hua Wu, Evansville, Ind., assignors to Mead Johnson & Company, Evansville, Ind., a corporation of Indiana No Drawing. Filed Oct. 21, 1958, Ser. No. 768,548

11 Claims. (Cl. 260—243)

This invention relates to 10-(1-substituted-3-pyrrolidylmethyl) phenothiazines and has more particular reference to a new class of compounds having the general formula

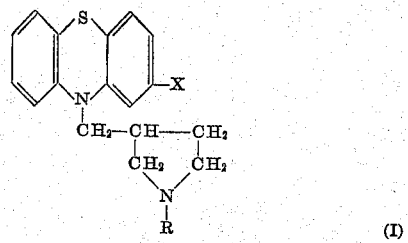

wherein R is selected from the group consisting of lower alkyl, lower alkenyl and lower alkyl phenyl and wherein X is selected from the group consisting of hydrogen, lower alkoxy and halogen, and the nontoxic acid addition and quaternary ammonium salts of such compounds.

The compounds of this invention have useful pharmacological properties since they are very active antihistaminic agents and also have pronounced antispasmodic activity. The 2-halo derivatives also are useful in the prevention of emesis and the induction of a tranquil state. The compounds may be administered as the free base or as the acid addition or quaternary ammonium salts and may be ingested in the form of tablets, capsules or elixirs. The size of the dose to control allergic manifestations or to control emesis and induce a tranquil state in an animal will depend upon the particular compound used, suitable dosages being between 0.1 to 1.0 milligram per kilogram of body weight administered one to three times daily.

The compounds of this invention may be readily prepared by the condensation of a 1-substituted-3-pyrrolidylmethyl halide with phenothiazine or a 2-substituted phenothiazine in the presence of sodamide or other appropriate catalytic reagent known to be useful in condensation reactions of this general type.

The 1-substituted-3-pyrrolidylmethyl halides that may be condensed with phenothiazine or a 2-halophenothiazine or a 2-alkoxy phenothiazine to produce the compounds of this invention are specifically disclosed in our copending application Serial No. 540,604, filed October 14, 1955, now Patent No. 2,826,588, and include those compounds in which the substituent in the 1 position is a lower alkyl, a lower alkenyl or a lower alkyl phenyl group, such as methyl, ethyl, n-propyl, isopropyl, butyl, allyl, benzyl and the like.

For a more complete understanding of this invention reference will now be made to specific procedures for preparing the herein claimed compounds.

10-(1-ETHYL-3-PYRROLIDYLMETHYL) PHENOTHIAZINE

A mixture of 199.3 parts of phenothiazine, 147.6 parts of 1-ethyl-3-pyrrolidylmethyl chloride (prepared in accordance with the disclosure in said Patent No. 2,826,588) and 39 parts of powdered sodamide with 515 parts of dry toluene was heated at reflux temperature for 20 hours. After cooling, the reaction mixture was treated with 250 parts of water and thoroughly shaken. The toluene layer was separated, washed once with water and then completely extracted with 3 N hydrochloric acid. The combined aqueous acid extract was made strongly basic with 56% potassium hydroxide to liberate the base as an oil. A complete extraction was made with ether and the combined ether extract dried with anhydrous magnesium sulfate. After filtration and removal of solvent by distillation, the residual darkly colored oil was distilled under reduced pressure. The yield was 172 parts, B.P. 180–205° C. at 0.1 to 0.15 mm. The yellow-brown distillate was very viscous and partially solidified upon standing at room temperature. Residual traces of phenothiazine were removed by treating the distillate first with 500 parts of 3 N hydrochloric acid and later diluting with 2500 parts of water. After removing the insoluble material by filtration, the clear cherry red solution was made basic with 150 parts of 56% potassium hydroxide and the liberated oil extracted with ether. The combined extract was dried with anhydrous magnesium sulfate. After filtration and removal of solvent by distillation, the residue solidified; yield 147.5 parts, M.P. 88–90° C. Further purification was made by dissolving the light orange colored product in hot heptane, decolorizing the solution with charcoal and cooling in an ice box. The cream colored crystals were collected, washed with cold heptane and dried at 50° C. Yield 126.5 parts (physical constants in accompanying table).

10-(1-METHYL-3-PYRROLIDYLMETHYL) PHENOTHIAZINE HYDROCHLORIDE

Ten and eight tenths parts of 10-(1-methyl-3-pyrrolidylmethyl) phenothiazine prepared from 1-methyl-3-pyrrolidylmethyl chloride by essentially the same procedure indicated above for the preparation of the 1-ethyl derivative in 80 parts of 99% isopropyl alcohol were treated with a solution of 1.33 parts of hydrogen chloride in 30 parts of the same solvent. The clear light yellow solution soon deposited white crystals of the acid addition salt. After cooling overnight at 0° C., the crystalline product was collected on a filter, washed with 99% isopropyl alcohol and anhydrous ether and then dried in a vacuum oven at 95° C. Yield 10.4 parts, M.P. 187.5–189°. Carbon: calculated 64.94; found 64.52. Hydrogen: calculated 6.36; found 6.06. Chlorine: calculated 10.65; found 10.60.

10-(1-BENZYL-3-PYRROLIDYLMETHYL) PHENOTHIAZINE HYDROCHLORIDE

Two parts of 10-(1-benzyl-3-pyrrolidylmethyl) phenothiazine prepared from 1-benzyl-3-pyrrolidylmethyl chloride by essentially the same procedure indicated above for the preparation of the 1-ethyl derivative were dissolved in 32 parts of heptane and the solution saturated with gaseous hydrochloric acid. The curdy pink precipitate was collected, washed with 30–40 petroleum ether and dried in air at room temperature. This crude highly colored product was first crystallized from anhydrous ethyl acetate and then recrystallized from acetone with decolorization with Nuchar. Yield of white crystalline solid was 1.3 parts. The solid decomposed when heated to 207–209° C. Carbon: calculated 70.49; found 70.56. Hydrogen: calculated 6.16; found 5.97. Chlorine: calculated 8.67; found 8.72.

10-(1-METHYL-3-PYRROLIDYLMETHYL) PHENOTHIAZINE METHOBROMIDE

A solution of 6 parts of 10-(1-methyl-3-pyrrolidylmethyl) phenothiazine in 50 parts of acetone was cooled in an ice bath and treated with 10 parts of methyl bromide. On standing, crystalline 10-(1-methyl-3-pyrrolidyl-methyl) phenothiazine methobromide separated. Crystallization of the crude product twice from 40 parts of hot methanol yielded 5.5 parts of the pure product; M.P. 215–217°. Carbon: calculated 58.31; found 58.42. Hydrogen: calculated 5.92; found 5.93. Bromine: calculated 20.42; found 20.49.

In the foregoing examples specific reference is made to the preparation of the 1-methyl, the 1-ethyl and the 1-benzyl derivatives and the hydrochlorides and the methyl bromides. However, it will be readily apparent that essentially the same procedures using unsubstituted phenothiazine and various other 1-substituted-3-pyrrolidylmethyl halides and esesntially the same molar ratios of reactants may be employed to prepare compounds having other substituents in the 1 position of the pyrrolidyl ring. A number of such phenothiazine derivatives have been prepared and their properties and analyses are set forth in the following table:

Table
10-(1-SUBSTITUTED-3-PYRROLIDYLMETHYL) PHENOTHIAZINES

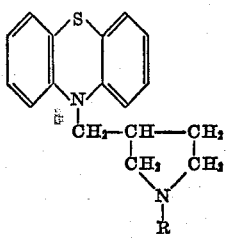

| R | M.P., 0° C. | Carbon | | Hydrogen | | Sulfur | |
|---|---|---|---|---|---|---|---|
| | | Calcd. | Found | Calcd. | Found | Calcd. | Found |
| CH₃ | 87–88 | 72.91 | 73.11 | 6.80 | 6.90 | 10.82 | 10.82 |
| C₂H₅ | 87–88.5 | 73.48 | 73.51 | 7.14 | 6.97 | 10.33 | 10.73 |
| C₃H₇ | 91–92 | 74.03 | 74.29 | 7.46 | 7.72 | 9.88 | 9.87 |
| i-C₃H₇ | 58–59 | 74.03 | 74.34 | 7.46 | 7.49 | 9.88 | 9.68 |
| CH₂=CH—CH₂ | 80–80.5 | 74.49 | 74.82 | 6.88 | 7.01 | 9.94 | 9.62 |
| C₄H₉ | 60–61 | 74.51 | 74.20 | 7.74 | 8.01 | 9.47 | 9.62 |
| C₆H₅—CH₂ | ¹ 225–235 | | | | | | |

¹ B.P. at .035 mm. Very viscous oil.

As will be noted from the foregoing table, all of the compounds excepting 1-benzyl derivative are solid at room temperature thereby facilitating their purification. They are all quite soluble in 1 N hydrochloric acid but care should be exercised upon acidification since they are precipitated by excess acid. The free solid bases and their acid solutions are quite photosensitive and readily turn pink unless protected from the light.

In the foregoing examples reference is made to specific compounds falling within the scope of this invention wherein the phenothiazine starting compound is unsubstituted, i.e., X=hydrogen in Formula I. However, as suggested, the hydrogen in the 2 position on the phenothiazine ring may be replaced by a halogen such as chlorine, bromine or iodine and the 2-halophenothiazine may be reacted with any one of the aforementioned 1-substituted-3-pyrrolidylmethyl halides to produce certain compounds of this invention. In such instances the 2-halophenothiazine starting materials may be prepared by known methods which may involve the cyclization of a 3-halodiphenylamine with sulfur as described by Charpentier in United States Patent No. 2,645,640, issued July 14, 1953.

2-CHLORO-10-(1-ETHYL - 3 - PYRROLIDYLMETHYL)PHENOTHIAZINE

A mixture of 233.7 parts of 2-chlorophenothiazine, 147.6 parts of 1-ethyl-3-pyrrolidylmethylchloride and 39 parts of powdered sodamide in 2 liters of dry toluene was refluxed for 36 hours. After cooling the reaction mixture was thoroughly shaken with 1 liter of water. The toluene layer was separated, washed again with water and then completely extracted with three 150 cc. portions of 3 N hydrochloric acid. The combined aqueous acid extract was diluted to 1 liter with water, filtered and the filtrate made basic with 40% sodium hydroxide liberating the crude basic phenothiazine as an oil. The oil was completely extracted from the basic aqueous phase with ether and the extract dried with anhydrous magnesium sulfate. After filtration and removal of solvent by distillation, the residual thick oil was distilled under reduced pressure. Yield 166 parts, boiling point 185° to 195° C. at .08 millimeter, of a very viscous glassy light yellow colored oil which solidified at temperatures of —20° to —40° C. but which resisted solidification at room temperature.

2-CHLORO-10-(1-ETHYL - 3 - PYRROLIDYLMETHYL)PHENOTHIAZINE HYDROCHLORIDE

A solution of 166 parts of viscous 2- chloro-10-(1-ethyl-3-pyrrolidylmethyl) phenothiazine in 2 liters of heptane was saturated with dry hydrochloric acid gas. The crude hydrochloride salt separated as a reddish brown solid that was both hygroscopic and light sensitive after collection and washing with fresh heptane. Yield 144 parts. The material was purified by two recrystallizations from anhydrous ethanol giving 73.6 parts of a white crystalline solid, melting at 138° to 140° C. after drying at 110° C. in vacuum. The analytically pure crystals are both hygroscopic and photophobic. The compound had the following elementary analysis: Calculated for $C_{19}H_{22}Cl_2N_2S$: carbon, 59.84; hydrogen, 5.81; chlorine, 18.59; found for product: carbon, 59.71; hydrogen, 6.20; chlorine, 18.09.

In the preceding two examples, specific reference is made to the preparation of the 1-ethyl derivative and the hydrochloride of the 1-ethyl derivative. It will be readily apparent that essentially the same procedures using various other 1-substituted 3-pyrrolidylmethyl halides and essentially the same molar ratios of reactants may be employed to prepare compounds having other substituents in the 1-position of the pyrrolidyl ring. A number of such compounds have been prepared by this procedure. For example, 2-chloro-10-(1-isopropyl - 3 - pyrrolidylmethyl) phenothiazine was prepared and had a boiling point of 195° to 210° C. at 0.04 millimeter of mercury pressure. The hydrochloride salt of this compound had a melting point of 204° to 206° C., and elementary analysis as follows: Calculated for $C_{20}H_{24}ClN_2S$: carbon, 60.75; hydrogen, 6.12; chlorine, 17.93; found for product: carbon, 61.06; hydrogen, 6.09; chlorine, 18.20.

Similarly, 2-chloro-10-(1-methyl-3-pyrrolidyl-methyl)

phenothiazine was prepared and had a boiling point of 185° to 200° C., at 0.14 millimeter of mercury pressure. The bitartrate and hydrochloride salts of this latter compound were prepared in the following manner:

2-CHLORO-10-(1 - METHYL-3-PYRROLIDYLMETHYL)PHENOTHIAZINE·D-BITARTRATE

An anhydrous methanolic solution of the thick glassy base was treated with an equivalent quantity of an anhydrous methanolic solution of d-tartaric acid. Upon dilution with anhydrous ether an oil separated that solidified after thorough washing with fresh portions of anhydrous ether. Further purification was effected by redissolving the solid in anhydrous methanol and reprecipitating in a similar manner. After drying in vacuum at 64° C., the solid melted with decomposition at about 100° C. Analysis: Calculated for $C_{22}H_{25}O_6ClN_2S$: carbon 54.94; hydrogen, 5.24; chlorine, 7.37; found: carbon, 55.61; hydrogen, 5.37; chlorine, 6.81.

2-CHLORO-10-(1 - METHYL-3-PYRROLIDYLMETHYL)PHENOTHIAZINE·HYDROCHLORIDE

A solution of the thick glassy base in an equal volume of anhydrous ethanol was treated with an equivalent amount of 3 N ethanolic hydrochloric acid. Upon cooling at −19° C., white crystals separated. Melting point, 189° to 191° C. after recrystallization from anhydrous ethanol and drying at 110° C. in vacuum. Analysis: Calculated for $C_{18}H_{20}Cl_2N_2S$: carbon, 58.85; hydrogen, 5.49; chlorine, 19.30; found: carbon, 59.43; hydrogen, 5.32; chlorine, 19.25.

The 2-chloro-10-(1-n-propyl-3-pyrrolidylmethyl)phenothiazine had a boiling point of 203° to 210° C. at 0.08 millimeter of mercury pressure and the hydrochloride salt had a melting point of 168° to 169° C. The elementary analysis of the salt was as follows: Calculated for $C_{20}H_{24}Cl_2N_2S$: carbon, 60.75; hydrogen, 6.12; chlorine, 17.93; found for product: carbon 60.91; hydrogen, 5.96; chlorine, 17.85.

The 2-chloro-10-(1-butyl-3-pyrrolidylmethyl)phenothiazine had a boiling point of 215° to 220° C. at 0.2 millimeter of mercury pressure. The hydrochloride had a melting point of 125° to 126° C. The salt had an elementary analysis as follows: Calculated for $C_{21}H_{26}Cl_2N_2S$: carbon, 61.60; hydrogen, 6.40; chlorine, 17.32; found for product: carbon, 61.85; hydrogen, 6.12; chlorine, 16.99.

As previously indicated the compounds of this invention include the 2-lower alkoxy derivatives, i.e., X=lower alkoxy in Formula I. These derivatives are prepared by reacting the appropriate 1-substituted-3-pyrrolidylmethyl chloride as above defined with the appropriate 2-alkoxy phenothiazine under essentially the same conditions previously given. The 2-alkoxy phenothiazines may be prepared in accordance with the process suggested in the Australian Journal of Chemistry 9, 400 (1956).

2-METHOXY-10-(1-METHYL-3-PYRROLIDYLMETHYL)PHENOTHIAZINE HYDROCHLORIDE

A mixture of 13.5 parts of 2-methoxy phenothiazine, 2.9 parts of sodium amide, 8 parts of 1-methyl-3-pyrrolidyl methyl chloride and 150 parts of dry toluene was refluxed with stirring for 18 hours. After cooling, the reaction mixture was carefully treated with 50 parts of water. The toluene layer was separated, washed once with water and then extracted with 40 parts of 3 N hydrochloric acid. The combined acid extract was made strongly basic with 56% potassium hydroxide to liberate the base as an oil. The mixture was extracted with ether and the combined ethereal extract dried with anhydrous magnesium sulfate. 2-methoxy-10-(1-methyl-3-pyrrolidylmethyl) phenothiazine was obtained as a light colored viscous oil by fractional distillation, B.P. 177–185° (0.4 mm.); yield, 8.4 parts.

The hydrochloric acid salt was prepared by dissolving the free base in 8 parts of isopropyl alcohol and treated with 5.3 parts of 4.87 N ethanolic HCl. The solution was diluted with 30 parts of isopropyl ether to deposit an oil, which crystallized after scratching. Recrystallization from isopropyl alcohol-isopropyl ether mixture yielded 4.8 parts of pure 2-methoxy-10-(1-methyl-3-pyrrolidylmethyl) phenothiazine hydrochloride, M.P. 167–169°. Carbon: calculated 62.88; found 62.58. Hydrogen: calculated 6.39; found 6.62. Chlorine, calculated 9.77, found 10.20.

In the example given immediately above, it will be readily appreciated that other lower alkoxy groups may be substituted for the 2-methoxy group. Thus by the same procedure, using the appropriate phenothiazine derivative the corresponding 2-ethoxy, 2-propoxy, 2-isopropoxy, 2-butoxy or other 2-lower alkoxy derivatives may be prepared.

As previously pointed out, the compounds may be administered as the free base or as the acid addition or quaternary ammonium salts. Examples of suitable acid addition salts which are included within the scope of this invention are the hydrochlorides, hydrobromides, hydroiodides, sulfates, phosphates, maleates, acetates, citrates, succinates, tartrates and the like. Suitable quaternary ammonium salts which are also included within the scope of this invention are those that may be obtained essentially as above described by the addition to the basic ester of alkyl or aralkyl esters of inorganic acids or organic sulfonic acids including such compounds as methyl chloride, methyl bromide, methyl iodide, ethyl bromide, propyl chloride, benzyl chloride, benzyl bromide, methyl sulfate, methyl benzenesulfonate, methyl paratoluenesulfonate and the like.

This application is a continuation in part of our co-pending applications Serial No. 540,605, filed October 14, 1955 and Serial No. 583,643, filed May 9, 1956, both now abandoned.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A compound selected from the group consisting of the 10-(1-substituted-3-pyrrolidylmethyl) phenothiazine having the formula

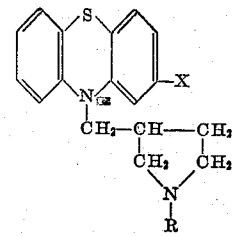

and the nontoxic pharmacologically acceptable acid addition and the nontoxic, pharmacologically acceptable lower alkyl halide quarternary ammonium salts thereof wherein X is selected from the group consisting of hydrogen, halogen and lower alkoxy and wherein R is selected from the group consisting of lower alkyl, lower alkenyl and lower alkyl phenyl.

2. 10-(1-methyl-3-pyrrolidylmethyl) phenothiazine.

3. 10-(1-ethyl-3-pyrrolidylmethyl) phenothiazine.

4. 10-(1-isopropyl-3-pyrrolidylmethyl) phenothiazine.

5. 10-(1-methyl-3-pyrrolidylmethyl) phenothiazine hydrochloride.

6. 10 - (1 - methyl - 3 - pyrrolidylmethyl) phenothiazine methobromide.

7. 2-halo-10-(1-lower alkyl-3-pyrrolidylmethyl) phenothiazine.

8. 2-chloro-10-(1-ethyl-3-pyrrolidylmethyl) phenothiazine.

9. 2-lower alkoxy-10-(1-lower alkyl-3-pyrrolidylmethyl) phenothiazine.

10. 2-methoxy-10-(1-methyl-3-pyrrolidylmethyl) phenothiazine.

11. 10-(1-lower alkyl-3-pyrrolidylmethyl) phenothiazine.

References Cited in the file of this patent

UNITED STATES PATENTS

| | | |
|---|---|---|
| 2,590,125 | Robinson | Mar. 25, 1952 |
| 2,784,185 | Schuler | Mar. 5, 1957 |

FOREIGN PATENTS

| | | |
|---|---|---|
| 772,179 | Great Britain | Apr. 10, 1957 |
| 774,882 | Great Britain | May 15, 1957 |
| 775,279 | Great Britain | May 22, 1957 |
| 775,280 | Great Britain | May 22, 1957 |
| 799,573 | Great Britain | Aug. 13, 1958 |

OTHER REFERENCES

Nieschulz: Arzn. Forsch., vol. 4, pp. 232–242 (1954).